(12) United States Patent
Cheng et al.

(10) Patent No.: US 11,048,589 B2
(45) Date of Patent: *Jun. 29, 2021

(54) PRESERVING DATA UPON A POWER SHUTDOWN

(71) Applicant: Western Digital Technologies, Inc., San Jose, CA (US)

(72) Inventors: Kai-Lung Cheng, Irvine, CA (US);
Yun-Tzuo Lai, Irvine, CA (US);
Eugene Lisitsyn, Anaheim, CA (US);
Jerry Lo, Hacienda Heights, CA (US);
Subhash Balakrishna Pillai, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/387,413

(22) Filed: Apr. 17, 2019

(65) Prior Publication Data

US 2019/0251028 A1 Aug. 15, 2019

Related U.S. Application Data

(63) Continuation of application No. 15/593,206, filed on May 11, 2017, now Pat. No. 10,289,551.

(51) Int. Cl.
*G06F 11/14* (2006.01)
*G06F 12/0804* (2016.01)

(52) U.S. Cl.
CPC ...... *G06F 11/1438* (2013.01); *G06F 11/1471* (2013.01); *G06F 12/0804* (2013.01);
(Continued)

(58) Field of Classification Search
CPC .... G06F 1/30; G06F 11/1438; G06F 11/1441; G06F 11/1471
(Continued)

(56) References Cited

U.S. PATENT DOCUMENTS 6,067,635 A 5/2000 DeKoning
8,055,858 B2 * 11/2011 Venturi ............... G06F 11/1441
711/154

(Continued)

*Primary Examiner* — Joseph R Kudirka
(74) *Attorney, Agent, or Firm* — Morgan, Lewis & Bockius LLP

(57) ABSTRACT

Host data segments are received and stored in a cached data unit corresponding to a previously stored data unit currently stored in non-volatile memory. Metadata is created that identifies unmodified previously stored segments of host data in the previously stored data unit that correspond to the received host data segments, the metadata including an update flag indicating that the previously stored data unit requires updating. In response to detecting the unexpected interruption of power, the cached data unit and the metadata is written to an area of the non-volatile memory array that is different than where the previously stored data unit is currently stored. Upon resuming operation following the unexpected interruption of power, the cached data unit is identified based on the update flag, as having been saved in response to the power shutdown without the previously stored data unit being updated in the non-volatile memory array, and then reloaded into the memory cache.

20 Claims, 3 Drawing Sheets

(52) U.S. Cl.
CPC .... *G06F 2201/805* (2013.01); *G06F 2201/82* (2013.01); *G06F 2212/1032* (2013.01); *G06F 2212/2022* (2013.01)

(58) Field of Classification Search
USPC ..................................................... 714/14, 22
See application file for complete search history.

(56) References Cited

U.S. PATENT DOCUMENTS

| | | | |
|---|---|---|---|
| 9,286,936 B1 * | 3/2016 | Poudyal | G11B 20/1217 |
| 10,445,311 B1 * | 10/2019 | Saurabh | G06F 16/2365 |
| 2010/0180065 A1 | 7/2010 | Cherian | |
| 2014/0019677 A1 | 1/2014 | Chang | |
| 2015/0169023 A1 | 6/2015 | Masarotti | |
| 2017/0139781 A1 | 5/2017 | Camp | |
| 2017/0329706 A1 | 11/2017 | Nemawarkar | |

\* cited by examiner

PRESERVING DATA UPON A POWER SHUTDOWN

CROSS-REFERENCE TO RELATED APPLICATION

The present application is a continuation of U.S. patent application Ser. No. 15/593,206, filed on May 11, 2017, now U.S. Pat. No. 10,289,551, which is hereby incorporated by reference herein.

BACKGROUND

The present disclosure relates to the saving of data during power interruption.

Flash memory enjoys a number of advantages over other types of storage devices. Flash memory generally offers faster read access times and better shock resistance than a hard disk drive (HDD). Unlike dynamic random access memory (DRAM), flash memory is non-volatile, meaning that data stored in a flash storage device is not lost when power to the device is removed. These advantages, and others, may explain the increasing popularity of flash memory for storage applications in devices such as memory cards, USB flash drives, mobile phones, digital cameras, mass storage devices, MP3 players and the like.

A flash memory storage system may experience unexpected power interruption or power loss during which the storage system may operate using backup power. A backup power source may provide power for only a short duration of time during which the storage system needs to save critical data stored in the volatile memory to ensure integrity of the data.

SUMMARY

The subject technology relates to a method for retrieving information stored in flash memory. According to various aspects, a data storage device may comprise a non-volatile memory array of memory die, a volatile memory; and a controller. The controller is configured to receive a plurality of host data segments for storage in the non-volatile memory array, store the received host data segments in a cached data unit within a memory cache of the volatile memory, the cached data unit corresponding to a previously stored data unit currently in the non-volatile memory array, create metadata for the cached data unit, the metadata identifying unmodified previously stored segments of host data in the previously stored data unit that correspond to the received host data segments, and an update flag indicating that the unmodified previously stored segments require updating, and detect, on an indication of a power shutdown, that the power shutdown is an unexpected interruption of power. In response to detecting the unexpected interruption of power, the controller is configured to write the cached data unit and the metadata from the memory cache to a first area of the non-volatile memory array that is different than a second area of the non-volatile memory array in which the previously stored data unit is currently stored, without updating the previously stored data unit in the second area, and upon resuming operation following the unexpected interruption of power, identify the cached data unit and the metadata in the first area, based on detecting the update flag, as having been copied from the memory cache in response to the power shutdown without the previously stored data unit being updated in the non-volatile memory array, and reload the cached data unit and the metadata into the memory cache from the first area of the non-volatile memory array.

The controller, upon resuming operation following the unexpected interruption of power, is further configured to update, after the updated data unit is reloaded, the unmodified previously stored segments of the previously stored data unit in the second area of the non-volatile memory array based on the metadata and the received host data segments in the cached data unit. Other aspects include corresponding systems, apparatuses, methods, and computer program products.

It is understood that other configurations of the present disclosure will become readily apparent to those skilled in the art from the following detailed description, wherein various configurations of the present disclosure are shown and described by way of illustration. As will be realized, the present disclosure is capable of other and different configurations and its several details are capable of modification in various other respects, all without departing from the scope of the present disclosure. Accordingly, the drawings and detailed description are to be regarded as illustrative in nature and not as restrictive.

DETAILED DESCRIPTION

Figure 1:
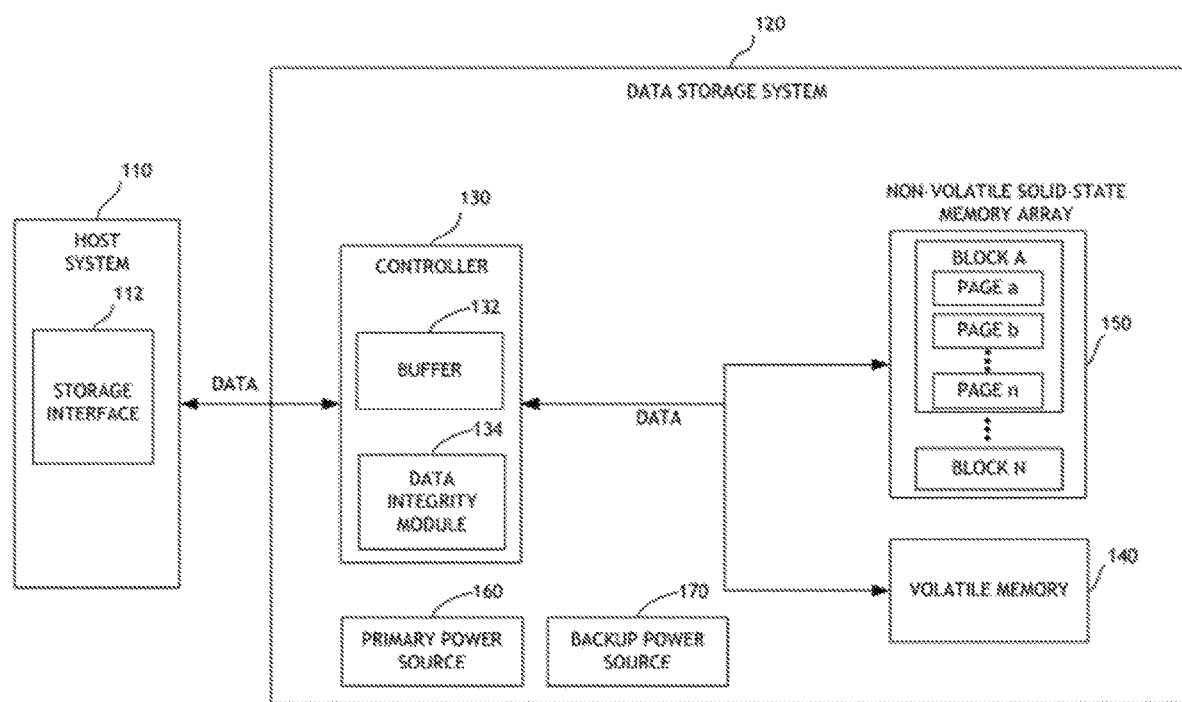
FIG. 1 depicts an example host system operably connected to an example data storage system.

The detailed description set forth below is intended as a description of various configurations of the present disclosure and is not intended to represent the only configurations in which the present disclosure may be practiced. The appended drawings are incorporated herein and constitute a part of the detailed description. The detailed description includes specific details for the purpose of providing a thorough understanding of the present disclosure. However, it will be apparent to those skilled in the art that the present disclosure may be practiced without these specific details. In some instances, structures and components are shown in block diagram form in order to avoid obscuring the concepts of the present disclosure. Like components are labeled with identical element numbers for ease of understanding.

Solid State Drives (SSD) are manufactured using flash memory cell architectures. Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory may thus operate at higher effective speeds than traditional EEPROM.

Current flash storage devices suffer from a number of limitations. Although flash memory may be read or written at the physical page level, it may only be erased or rewritten at the block level. Beginning with a pre-erased block, data may be written to any physical page within that block. However, once data has been written to a physical page, the contents of that physical page cannot be changed until the entire block containing that physical page is erased. In other words, while flash memory may support random-access read and write operations, it may not support random-access rewrite or erase operations.

To reduce the number of write operations and to improve performance, flash storage devices perform various caching techniques when operating on the data. For example, modifications to data in the cache may not copy to the flash memory until absolutely necessary. Host data is updated in volatile memory until it is ready to be saved to the non-volatile memory, and then saved to non-volatile memory when convenient.

In addition to non-volatile flash memory, many flash storage devices include a controller and volatile memory, such as DRAM, which are used in the management of the read and write operations of the flash storage devices and in the communication between the flash storage devices and the host devices to which they are connected. For example, DRAM may contain an addressing table correlating logical addresses used by the host device with physical addresses in the non-volatile flash memory where data is stored. Many flash storage devices are dependent upon a host device to which they are connected for power. On a sudden and unexpected loss of power (e.g., due to the flash storage device being unplugged from the host), the information stored in the volatile memory of a flash storage device may be lost, which may result in data corruption or an undue delay in recreating the addressing table upon the restoration of power. To address this problem, flash storage devices include mechanisms for providing enough emergency power to provide time for the addressing table(s) to be copied to the non-volatile flash memory.

FIG. 1 depicts an example host system 110 operably connected to an example data storage system, according aspects of the subject technology. In the depicted example, the data storage system 120 (e.g., a solid-state drive) includes a controller 130, volatile memory 140, and a non-volatile solid-state memory array 150.

Controller 130 or one or more components therein, may be configured to execute code or instructions to perform the operations and functionality described herein. For example, controller 130 may be configured to perform operations for managing request flow and address mappings, and to perform calculations and generate commands. The processor of controller 130 may be a general-purpose microprocessor, a multi-core processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions executed by controller 130 and/or its processor may be stored and read from volatile memory 140 or non-volatile memory array 150, electronic media, optical media, magnetic media, or other type(s) of storage medium. These storage mediums represent examples of tangible and/or non-transitory machine or computer readable media on which instructions/code executable by controller 130 and/or its processor may be stored. In some implementations, the instructions may be received from host system 110 (for example, via a host interface).

Volatile memory 140 may comprise random access memory (RAM), static random-access memory (SRAM), dynamic random-access memory (DRAM), synchronous dynamic random-access memory (SDRAM), such as DDR3, or any combination thereof. The non-volatile solid-state memory array 150 includes flash memory. Memory array 150 may include, according to various aspects, one or more flash integrated circuits, Chalcogenide RAM (C-RAM), Phase Change Memory (PC-RAM or PRAM), Programmable Metallization Cell RAM (PMCRAM or PMCm), Ovonic Unified Memory (OUM), Resistance RAM (RRAM), NANO memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. Data storage system 120 may further include other types nonvolatile and/or volatile storage, such as magnetic storage.

Non-volatile solid-state memory array 150 may include multiple non-volatile devices (e.g., flash memory die). Memory array 150 may include multiple flash memory devices split among multiple channels. Each flash memory device may comprise one or more physical flash chips, or may comprise different numbers of flash chips. For example, within solid-state memory array 150, some of the flash memory devices may comprise one flash chip while others may comprise more than one flash chip.

A flash storage device of memory array 150 may include one or more flash memory interfaces. Each flash memory interface interfaces the controller 130 to one of the flash memory devices via a corresponding channel. Each of the channels may be implemented using one or more physical I/O buses coupled between one of the flash memory interfaces and the corresponding flash device(s). Each channel allows the corresponding flash memory interface to send read, write and/or erase commands to the corresponding flash memory device. Each flash memory interface may include a register (e.g., First-In-First-Out (FIFO) register) that queues read, write and/or erase commands from the controller 130 for the corresponding flash memory device. Although the term "channel," as used above, referred to the bus coupled between a flash memory interface and the corresponding flash memory device, the term "channel" may also refer to the corresponding flash memory device that is addressable through the bus.

The flash devices of memory array 150 may be divided into blocks. Each data block may be further divided into data units. A "data unit" as described herein, may include a page of data. For example, each data block may be 128 kilobytes (K bytes) in size, and each data unit may be 4 kilobytes (K bytes) in size. In this example, each data block has 32 4 K byte data units. The data blocks may have other sizes besides 128 K bytes, including, but not limited, to 256 K bytes or 512 K bytes. For example, a 256 K byte data block may have 64 4 K byte data units. The data units may also have other sizes besides 4 K bytes. For example, the data units may have any size that is a multiple of 1 K bytes or 2 K bytes.

The controller 130 may be configured to receive data and/or storage access commands from a storage interface module 112 (e.g., a device driver) of a host system 110. Storage access commands communicated by the storage interface module 112 may include read and write commands issued by the host system 110. Read and write commands may specify a logical address (e.g., logical block addresses or LBAs) used to access the data storage system 120. The controller 130 may execute the received commands in the memory array 150.

Data storage system 120 may store data communicated by the host system 110. In other words, the data storage system 120 may act as memory storage for the host system 110. To facilitate this function, the controller 130 may implement a logical interface. The logical interface may present to the host system 110 the data storage system's memory as a set of logical addresses (e.g., contiguous address) where host or user data may be stored. Internally, the controller 130 may map logical addresses to various physical locations or addresses in the memory 150. The controller 130 includes a buffer 132, which may comprise volatile memory, such RAM, SRAM, DRAM, SDRAM, etc. In some implementations, the buffer 132 may be external to the controller 130. The controller 130 may also include a data integrity module 134 configured to monitor and maintain the integrity of data stored in the data storage system 120. In some implementations, the data integrity module 134 maintains integrity of the data when the data storage system 120 experiences a power interruption or loss condition.

In some implementations, buffer 132 or volatile memory 140 may be utilized as memory cache, such as a write cache buffer for the memory array 150. For example, data storage system 120 may cache a small amount of host data for various reasons, such as in order to improve write performance. In various implementations, data storage system 120 ensures integrity of host data, particularly in the event that the data storage system experiences a sudden or unexpected power loss. That is, data storage system 120 moves cached host data from the buffer 132 to the non-volatile memory 150.

In some implementations, the data storage system 120 maintains a map or mapping between logical addresses used by host system 120 and physical memory locations in the non-volatile solid-state memory array 150. The mapping may be structured to provide a look-up of a physical address corresponding to a logical address, and the mapping may be indexed based on the logical addresses (and/or based on physical addresses). The size of the smallest unit written by host system 110 to data storage system 120 may be different than the smallest data unit stored in non-volatile memory array 150 by data storage system 120. For example, the data units of data storage system 120 may be 4 kilobytes in size and the host data segments written by host system 120 may be 512 bytes in size. The mapping between logical addresses used by host system 120 and the physical memory locations in the non-volatile solid-state memory array 150 may account for this difference.

The mapping may be maintained as a table and/or any other suitable data structure. Physical memory location corresponding to a given logical address (e.g., LBA) may change as a result of host data being moved. For example, host data may be moved within the memory array 150 due to one or more housekeeping operations, such as garbage collection (e.g., reclaiming memory space used by invalid data), wear leveling (e.g., spreading out the write load substantially evenly across memory pages and/or blocks), memory refresh (e.g., periodically refreshing stored data), bad block management (e.g., discovering and not using for storage unreliable data blocks), etc. In addition, when host system 110 writes data for a particular logical address, the mapping for this logical address may change due to the data being stored in a different physical memory location. For example, host system 110 may store data for an LBA to data storage system 120, which is then stored by data storage system 120 in a first physical address. At a later time, updated data for the LBA may be received from host system 100, causing the data stored at the corresponding first physical address to become invalid.

In certain implementations, the data storage system 120 maintains a journal which contains mapping information for a block. For example, the journal may contain logical-to-physical (and/or physical-to-logical) mapping information for a given block, and the journal may be used to track the host data written to the given block. The journal may include a history of host commands ordered chronologically. Journal data may be periodically flushed or written to the non-volatile solid-state memory array 150.

In various implementations, incoming (e.g., hot) host data may be partially of fully cached in the buffer 132 before being written to the non-volatile solid-state memory array 150. Because host data segments (e.g., host sectors) may be smaller in size (e.g., 512 bytes) than the smallest data unit that may be stored in non-volatile memory array 150 (e.g., 4 kilobytes), incoming host data segments may be written and/or updated in volatile memory first (e.g., in buffer 132) and then transferred to non-volatile memory array 150 as data units, or blocks.

In this regard, controller 130 may implement a read-modify-write process to update the data at the physical address. During a read-modify-write process, unmodified previously-stored data is loaded into memory cache, merged with recently received host data in the memory cache, and then stored back to non-volatile memory. The read-modify-write process may be initiated periodically, or may be triggered upon certain trigger conditions being met (e.g., threshold amount of host data in the memory cache, upon a threshold number of resources being available, etc.) In one example, host data segments are received from host system 110 and cached in a cached data unit that corresponds to a previously stored data unit in non-volatile memory array 150. When controller 130 determines the received host data should be written to non-volatile memory array 150 the previously stored data unit is loaded into the memory cache and then modified with the received host data from the cached data unit. The modified data unit is then stored back to non-volatile memory array 150. In some implementations, the entire read-modify-write process may be performed as an atomic operation. In some implementations, when the entire cached data unit is filled with new host data, the cached host data unit may be written directly to non-volatile memory array 150. In some instances, the cached data unit may be written to a new physical memory address and the host LBAs updated to reflect the new address.

As will be described further with regard to FIG. 2, data storage system 120 may further create metadata for incoming host data segments that includes a logical-to-physical mapping between the host data segments currently stored in a cached data unit within the memory cache, and a previously stored data unit of the host data in non-volatile memory array 150. The metadata may be cached with the host data segments in the memory cache, and then stored (e.g., with the host data) in the non-volatile memory array 150 when a host data unit is stored to the memory array.

Upon normal shutdown or restart of the data storage system 120, the controller 130 may save or flush cached host data units from the memory cache to the non-volatile memory array 150 along with performing other shutdown operations, including for example updating the logical-to-physical mapping or updating journal data. However, an unexpected power loss could result in a loss of host data units currently stored in the memory cache. In this regard, data storage system 120 may include a primary power source 160 and a backup power source 170. The primary power source 160, which may be a power supply connected to an alternating current (AC) or direct current (DC) power source, provides power to the data storage system 120 during normal operation. The backup power source is configured to provide temporary power to the data storage system 120 when primary power is interrupted or lost unexpectedly. The backup power source may include one or more power storage devices. For example, the backup power source may include one or more capacitors, such as one or more onboard capacitors or super-capacitors.

As will be described further, host data segments are received from host system 110 and stored in cached data units that correspond to a previously stored data units currently stored in non-volatile memory array 150. Controller 130 creates metadata that identifies unmodified host data segments within the previously stored data unit that correspond to the received host data segments. The metadata may also include an update flag indicating that the previously stored data unit requires updating. In response to detecting an unexpected interruption of power, read operations may be cancelled to preserve power and controller bandwidth to support writing the cached data units to non-volatile memory. In this regard, read-modify-write operations may also be cancelled or suspended. The cached data units and corresponding metadata may then be written to non-volatile memory array 150 as-is, without merging the data with previously stored data units. The cached data units and corresponding metadata may be stored in a predetermined area of non-volatile memory array 150 that is different than where the previously stored data unit is currently stored. Upon resuming operation following the unexpected interruption of power, each cached data unit is identified within the non-volatile memory as being a previously stored cached data unit rather than normal host data based on, for example, detection of the update flag. The identified cached data units are then reloaded into the memory cache.

Figure 2A:
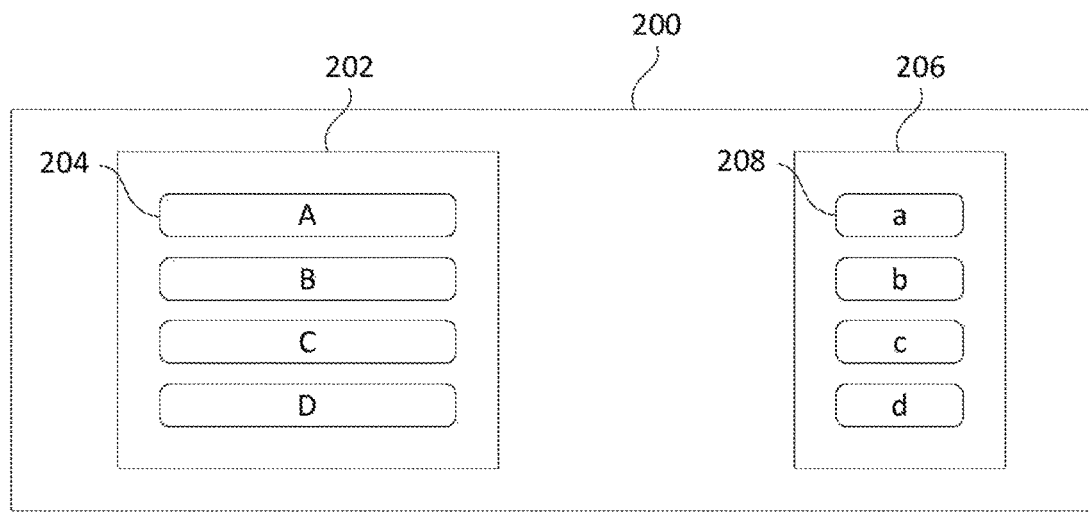
FIG. 2A depicts a cache memory, including a first area of memory storing cached host data units and a second area of memory storing metadata entries for the cached data units.

FIG. 2A depicts a cache memory 200, including a first area of memory 202 storing cached host data units 204 and a second area of memory 206 storing metadata entries 208 for the cached data units. Cache memory 200 may be allocated within volatile memory 140, or may exist in different volatile memories. For example, first area of memory 202 may be in volatile memory 140 and second area of memory 206 may be within an on-chip cache. Each data unit 204 (labeled A, B, C, D, etc. in the depicted example) may include multiple host data segments received from host system 110. For example data unit A may be 4 kilobytes in length, and include eight 512 kilobyte host segments. As will be described further, each cached data unit 204 corresponds to a previously stored data unit in non-volatile memory array 150.

Second area of memory 206 may include a caching table, with each metadata entry 208 in the table (labeled a, b, c, d, etc. in the depicted example) being associated with a corresponding cached data unit 204. As an example, when a host data segment is received from host system 110 and stored as part of cached data unit A, a corresponding metadata entry a may be updated to log the newly-received data. As will be described further, each metadata entry 208 may include an identification of host data segments in a data unit previously stored in non-volatile memory array 150 that correspond to recently received host data segments in the corresponding data unit 204, and that require updating to reflect the newly-received data. Each metadata entry 208 may also include an update flag indicating that the previously stored data unit in non-volatile memory array 150 requires updating.

Figure 2B:
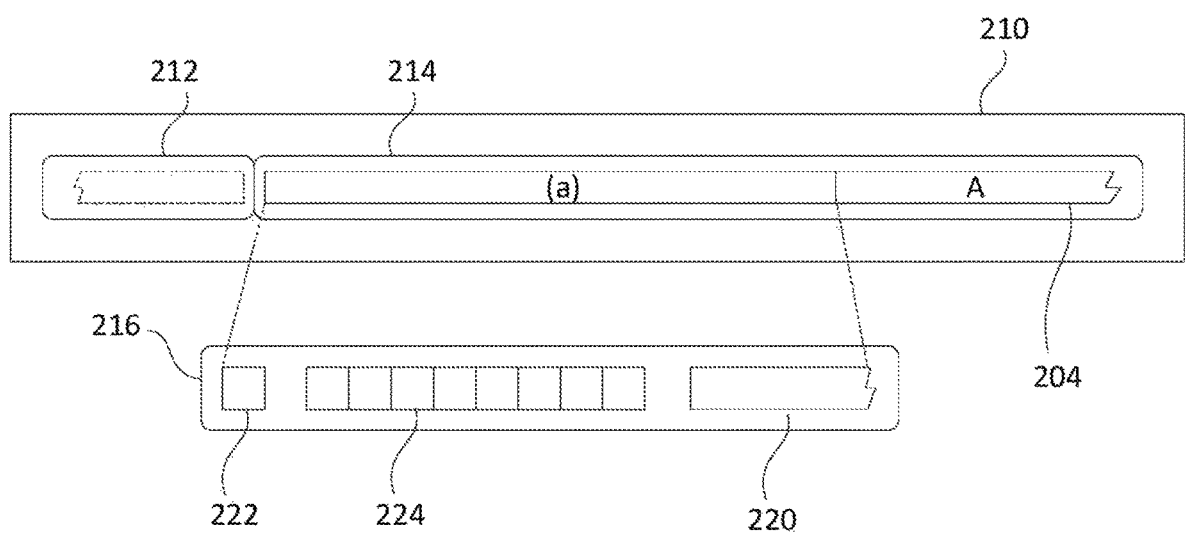
FIG. 2B depicts a non-volatile memory area storing a series of example stored data entries, including an exploded depiction of a metadata portion of a data entry.

FIG. 2B depicts a non-volatile memory area 210 storing a series of example stored data entries 212 and 214, including an exploded depiction 216 of a metadata portion of data entry 214. Non-volatile memory area 210 may be an area of non-volatile memory array 150 designated for cached data that was stored in response to an unexpected power outage, without updating previously stored data units. In the depicted example, non-volatile memory area 210 is different than an area of non-volatile memory in which previously-stored data units corresponding to cached data units 204 are stored. The depicted data entry 214 includes a data unit 204 (data unit A) received from cache memory 200, and metadata 216 that corresponds to the metadata entry 208 for the data unit. In some implementations, metadata 216 may be stored separately from data entry 214.

Data unit 204 within data entry 214 is representative of host data received from host system 110. As described previously, data unit 204 may include multiple host segments of data (e.g., sectors). Metadata structure 216 describes various characteristics of the host data segments within data unit 204. For example, metadata 216 may include an address mapping 220 that includes one or more logical addresses for the host data segments in data unit 204, and/or a physical address in non-volatile memory array 150 at which a corresponding previously stored data unit of data unit 204 (including the host data segments) is stored. The physical location may be an address or, in some implementations, a number representative of a location in memory (e.g., an offset from an address). According to various implementations, metadata structure 216 also identifies, in part, which host data segments of the previously stored data unit of the data unit were modified in data unit 204 by host system 110.

Metadata 216 may also include a flag 222 and a data mask 224. Flag 222 is an indicator of whether this data entry 214 (and/or its data unit 204) includes updated host data that needs to be processed by a read-write-modify-process, or if it is data that may be written directly written to non-volatile memory array 150. Flag 222 may be a single bit at a predetermined location in metadata 216. When the flag is set (e.g., to '1' instead of '0') the data unit 204 associated with metadata 216 may be identified as including modified portions of the corresponding previously stored data unit of data unit 204, currently stored in non-volatile memory array 150.

Data mask 224 identifies unmodified, previously stored segments of host data in the previously stored data unit that correspond to recently received host data segments in data unit 204 of data entry 214. Mask 224 may be a bit mask, with a number of bits equal to a number of host data segments within data unit 204 (or a size of data unit 204 divided by a size of a host data segment). Each bit in the sequence of bits of the mask may correspond to a predetermined offset from a starting address of data unit 204 (and/or from the corresponding payload of the original data unit stored in the original location of non-volatile memory array 150). Setting a bit within the mask (e.g., to '1' instead of '0') may indicate that the corresponding location within data unit 204 is new host data (or otherwise affected data) that needs to be updated in the previously stored data unit of data unit 204. In some implementations, mask 224 may designate addresses or offsets within the data unit 204 (of a previously stored data unit of a data unit) that correspond to new and/or affected data.

Figure 3:
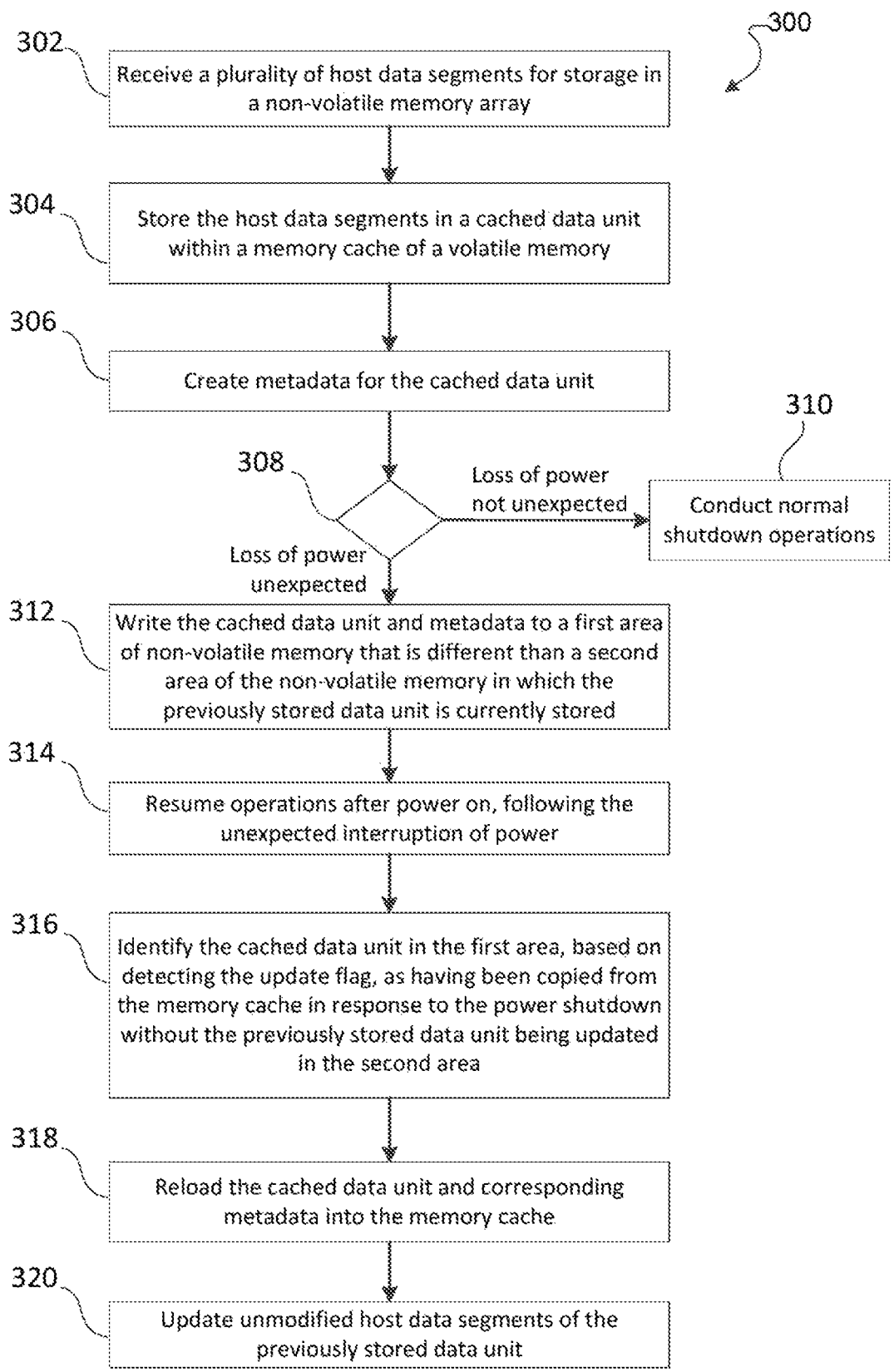
FIG. 3 depicts a flow diagram of a first example process for saving data when power is lost.

FIG. 3 depicts a flow diagram of a first example process 300 for saving data when power is lost, according to various aspects of the subject technology. For explanatory purposes, the various blocks of example process 300 are described herein with reference to the components and/or processes described herein. The one or more of the blocks of process 300 may be implemented, for example, by one or more processors, including, for example, controller 130 of FIG. 1 or one or more components or processors of controller 130.

In some implementations, one or more of the blocks may be implemented apart from other blocks, and by one or more different processors or controllers. Further for explanatory purposes, the blocks of example process 300 are described as occurring in serial, or linearly. However, multiple blocks of example process 300 may occur in parallel. In addition, the blocks of example process 300 need not be performed in the order shown and/or one or more of the blocks of example process 300 need not be performed.

Process 300 may be executed by the controller 130 and/or the data integrity module 134. Data storage system 120 begins by receiving a plurality of host data segments for storage in the non-volatile memory array (302). The received host data segments are stored (e.g., temporarily) in a cached data unit within a memory cache of the volatile memory (304). As described previously, the cached data unit corresponds to a previously stored data unit currently in the non-volatile memory array 150. Metadata 208 for the cached data unit 204 is created (306). Metadata 208 identifies unmodified segments of host data in the previously stored data unit that correspond to the received host data segments. As described previously, metadata 208 may include an update flag indicating that the unmodified segments in the previously stored data unit require updating. As described previously, metadata 208 may also include a bitmask identifying the unmodified segments of the previously stored data unit that correspond to the received host data segments.

Data storage system 120 (and/or controller 130) detects, on an indication of a power shutdown, whether the power shutdown is an unexpected interruption of power (308). In some implementation, this determination may be made by interrogating the primary power source 160 to determine whether it continues to supply power. If loss of power is not unexpected, process 300 proceeds with normal shutdown operation (310). In this regard, cached (or hot) host data and system data stored in volatile memory are processed in a normal operational manner (e.g., undergoing a read-modify-write) and saved to non-volatile solid-state memory array 150. The mapping data is updated and may be written to the non-volatile solid-state memory array 150.

If controller 130 determines that power was lost or interrupted unexpectedly (and the data storage system 120 is operating on backup power), the cached data unit and the metadata is written from the memory cache to a first area of the non-volatile memory array 150 that is different than a second area of the non-volatile memory in which the previously stored data unit is currently stored (312). According to various implementations, each cached data unit is written without updating the previously stored data unit in the second area. In this regard, controller 130 may cancel or suspend read operations (e.g., all or a subset of outstanding read operations), thereby canceling or suspending the normal read-modify-write process. The cached data units and corresponding metadata are then written to non-volatile memory array 150 as-is, without going through the normal read-modify-write process to merge the data with previously stored data units. As discussed previously, the metadata may contain a special marker—e.g., update flag 222—indicating that the cached data unit was stored without going through the merge process. Update flag 222 may be set prior to or after the power shutdown is initiated. In some implementations, the update flag may be set when one or more portions of the updated data unit is first written or updated in the memory cache. In some implementations, the update flag is set in response to detecting the unexpected interruption of power.

At some point in time, data storage unit 120 is powered back on, and operations are resumed following the unexpected interruption of power (314). Upon resuming operation following the unexpected interruption of power, the cached data unit in the first area is identified as having been copied from the memory cache in response to the power shutdown without the previously stored data unit being updated in the second area of the non-volatile memory (316). The updated data unit may be identified based on, for example, detecting the update flag in the metadata during a scan of the non-volatile memory for data units that include an update flag. In this regard, controller 130 is particularly configured to scan for update flags within, for example, a predetermined area of the non-volatile memory array 150 designated for storing cached data during an unexpected power shutdown.

Once found, the cached data unit and its corresponding metadata are then reloaded into the memory cache from the first area of the non-volatile memory (318). The unmodified segments of the previously stored data unit are updated based on the metadata and the received host data segments in the cached data unit (320). In this regard, the previously cancelled or suspended read-modify-write process may be re-initiated for the data units that are reloaded into the memory cache, and the unmodified segments may be modified with the received host data segments during the read-modify-write process, as previously described. The previously stored data unit may be located based on a physical address within address mapping 220 of metadata 216, and the bitmask within the metadata may facilitate identifying which portions of the previously stored data unit require updating.

In some instances, the bitmask (or the update flag) may indicate that all portions of the previously stored data unit has been updated. In this case, controller 130 may forego the read-write modify process and directly write the reloaded data unit directly to non-volatile memory array 150. In either case, the data unit may be written to the same address identified in the address mapping (after erasing the previously stored data), or a new address followed by updating the address mapping.

Accordingly, the memory cache that existed prior to the unexpected shutdown may be restored by locating all data associated with an update flag. Controller 130 may then read the mapping data of the reloaded units (e.g., as they are loaded or after loading is complete for all units) to locate the corresponding original or previously stored data units in the non-volatile memory that were not updated during the unexpected shutdown. Controller 130 may proceed to resume normal read-modify-write operations upon the cached data as if the shutdown did not occur, updating each original data unit stored in non-volatile memory array in turn or as needed. In some implementations, controller 130 may cycle through each of the data units reloaded into memory cache, and update all of the corresponding previously stored data units before proceeding with normal operation of data storage device 120, and/or other read write operations with respect to other incoming host data. The mapping tables of data storage device 120 (and, e.g., journal entries) may also be restored based on the metadata of the reloaded data units.

Many of the above-described features of example process 300 and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

As further depicted in FIG. 1, data storage system 120 may also include a bus (labeled "DATA"). The bus may use suitable interfaces standard including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS) and Peripheral Component Interconnect Express (PCIe).

Host device 110 and data storage system 120 may be in communication with each other via a wired or wireless connection and may be local to or remote from one another. According to some aspects, data storage system 120 may include pins (or a socket) to mate with a corresponding socket (or pins) on host device 110 to establish an electrical and physical connection. According to one or more other aspects, data storage system 120 includes a wireless transceiver to place host device 110 and data storage system 120 in wireless communication with each other.

A flash device of non-volatile memory 150 represents a non-volatile memory device for storing data. According to one aspect of the present disclosure, each flash device may include, for example, a NAND flash memory. Flash memory may have a standard interface specification. This standard ensures that chips from multiple manufacturers may be used interchangeably (at least to a large degree). The interface may further hide the inner working of the flash memory and return only internally detected bit values for data.

The term "software" is meant to include, where appropriate, firmware residing in read-only memory or applications stored in magnetic storage, which may be read into memory for processing by a processor. Also, in some implementations, multiple software aspects of the subject disclosure may be implemented as sub-parts of a larger program while remaining distinct software aspects of the subject disclosure. In some implementations, multiple software aspects may also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the present disclosure, and the present disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader)

A phrase such as an "aspect" does not imply that such aspect is essential to the present disclosure or that such aspect applies to all configurations of the present disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the present disclosure or that such implementation applies to all configurations of the present disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the present disclosure or that such configuration applies to all configurations of the present disclosure. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A data storage system, comprising:
   one or more non-volatile memories; and
   a controller configured to:
   store one or more data segments in a data unit, the data unit corresponding to a previously stored data unit in one or more first areas of the one or more non-volatile memories;
   store metadata for the data unit, the metadata providing an indication whether to update one or more data segments in the previously stored data unit;
   responsive to a power interruption being detected, write the data unit and the metadata to one or more second areas of the one or more non-volatile memories that are different from the one or more first areas; and
   identify, based on the indication, whether the data unit and the metadata have been written to the one or more second areas without the previously stored data unit being updated.

2. The data storage system of claim 1, wherein the power interruption is an unexpected power interruption, and wherein the controller is further configured to:
   store the one or more data segments in the data unit within one or more volatile memories;
   store the metadata within the one or more volatile memories; and
   upon resuming operation following the unexpected power interruption:
   identify that the data unit and the metadata have been written to the one or more second areas without the previously stored data unit being updated;
   reload the data unit and the metadata into the one or more volatile memories from the one or more second areas of the one or more non-volatile memories; and
   update, after the data unit is reloaded, the one or more data segments of the previously stored data unit in the one or more first areas, based on the metadata and the one or more data segments in the data unit.

3. The data storage system of claim 2, wherein the metadata includes an address mapping to the one or more first areas, and wherein the controller configured to update the one or more data segments of the previously stored data unit comprises the controller further configured to:
   load the previously stored data unit into memory cache of the one or more volatile memories from the one or more first areas based on the address mapping;
   update the previously stored data unit with the one or more data segments from the reloaded data unit; and
   store the updated previously stored data unit in the one or more non-volatile memories.

4. The data storage system of claim 2, wherein the controller is further configured to, in response to detecting the unexpected power interruption, suspend read operations in connection with writing the data unit and the metadata to the one or more second areas of the one or more non-volatile memories.

5. The data storage system of claim 2, wherein the controller is further configured to:
   perform, after resuming operation following the power interruption and after reloading the data unit, a read-modify-write process within memory cache of the one or more volatile memories to update the one or more data segments of the previously stored data unit with the one or more data segments in the data unit.

6. The data storage system of claim 1, wherein the metadata comprises a bitmask identifying the one or more data segments of the previously stored data unit that correspond to the one or more data segments in the data unit.

7. The data storage system of claim 1, wherein the controller is further configured to identify the data unit in the one or more second areas based on a scanning of the one or more non-volatile memories for data units designated as having been copied from memory cache of one or more volatile memories in response to detecting the power interruption without the previously stored data unit being updated in the one or more non-volatile memories.

8. The data storage system of claim 6, wherein the one or more data segments in the data unit comprise one or more data segments received from a host, and wherein the controller is further configured to:
   set an update flag in the metadata to identify the data unit as including the received one or more data segments; and
   upon resuming operation following the power interruption, identify the data unit based on the update flag being detected during the scanning.

9. The data storage system of claim 8, wherein the controller is further configured to set the update flag in response to detecting the power interruption.

10. A storage controller, comprising:
    means for storing one or more data segments in a data unit, the data unit corresponding to a previously stored data unit in one or more first areas of one or more non-volatile memories;
    means for storing metadata for the data unit, the metadata providing an indication whether to update one or more data segments in the previously stored data unit;
    means for writing, in response to detecting a power interruption, the data unit and the metadata to one or more second areas of the one or more non-volatile memories that are different from the one or more first areas; and
    means for identifying, based on the indication, whether the data unit and the metadata have been written to the one or more second areas without the previously stored data unit being updated.

11. The storage controller of claim 10, further comprising:
    means for updating, upon resuming operation following the power interruption, the one or more data segments in the previously stored data unit stored in the one or more first areas of the non-volatile memories.

12. The storage controller of claim 10, further comprising:
means for scanning the one or more non-volatile memories for data designated as having been copied from memory cache of one or more volatile memories in response to detecting the power interruption without the previously stored data unit being updated in the one or more non-volatile memories.

13. The storage controller of claim 12, wherein the one or more data segments in the data unit comprise one or more data segments received from a host, and wherein the storage controller further comprises:
means for setting an update flag in the metadata to identify the received one or more data segments in the one or more second areas of the one or more non-volatile memories; and
means for identifying, upon resuming operation following the power interruption, the received one or more data segments, based on the update flag being detected when the one or more non-volatile memories are scanned.

14. A machine-implemented method, comprising:
storing one or more data segments in a data unit, the data unit corresponding to a previously stored data unit in one or more first areas of one or more non-volatile memories;
storing metadata for the data unit, the metadata providing an indication whether to update one or more data segments in the previously stored data unit;
responsive to a power interruption being detected, writing the data unit and the metadata to one or more second areas of the one or more non-volatile memories that are different from the one or more first areas; and
identifying, based on the indication, whether the data unit and the metadata have been written to the one or more second areas without the previously stored data unit being updated.

15. The method of claim 14, further comprising:
updating, upon resuming operation following the power interruption, the one or more data segments of the previously stored data unit in the one or more first areas of the one or more non-volatile memories based on the metadata and the one or more data segments in the data unit.

16. The method of claim 15, further comprising:
reloading the data unit and the metadata into memory cache of one or more volatile memories from the one or more second areas of the one or more non-volatile memories,
wherein the metadata includes an address mapping to the one or more first areas, and
wherein updating the one or more data segments of the previously stored data unit comprises:
loading the previously stored data unit into the memory cache of the one or more volatile memories from the one or more first areas based on the address mapping;
updating the previously stored data unit with the one or more data segments from the reloaded data unit; and
storing the updated previously stored data unit in the one or more non-volatile memories.

17. The method of claim 14, wherein the metadata comprises a bitmask identifying the one or more data segments of the previously stored data unit that correspond to the one or more data segments in the data unit.

18. The method of claim 14, further comprising:
in response to detecting the power interruption, suspending read operations in connection with writing the data unit and the metadata to the one or more second areas of the one or more non-volatile memories.

19. The method of claim 14, wherein the one or more data segments in the data unit comprise one or more data segments received from a host, and wherein the method further comprises:
prior to a power shutdown, setting an update flag in the metadata to identify the data unit as including the received one or more data segments; and
upon resuming operation following the power interruption, scanning the one or more non-volatile memories for data units having the update flag set in the metadata, wherein the received one or more data segments are identified in the one or more second areas during the scanning based on the update flag being detected.

20. The method of claim 19, wherein the update flag is set in response to detecting the power interruption.

* * * * *